9104X
Kimball, Percy & Spalding,
Making Hoops.
Patented Sep. 18, 1835.
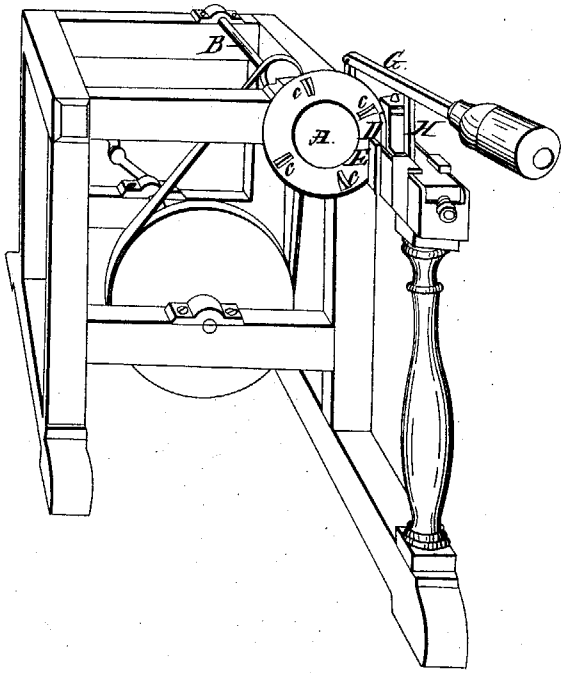
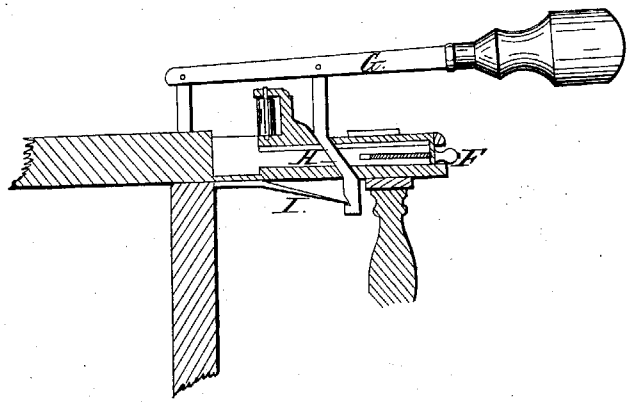
AM. PHOTO-LITHO. CO. N.Y. (OSBORNE'S PROCESS)

William B. Kimball, Abiel Percy & Franklin Spalding
of New Hampshire

560 Letters Patent

The Schedule referred to in these Letters Patent and making part
of the same, containing a description in the words of the said Willm
B. Kimball, Abiel Percy and Franklin Spalding themselves of
their improvement in a Machine for dressing hoops for Barrels -

To all, whom it may concern

Be it known, that we, William B. Kimball, Abiel Percy and
Franklin Spalding of Peterborough in the county of Hillsborough
and state of New Hampshire have jointly invented a new and im-
proved machine for the purpose of dressing hoops for barrels, and
we do hereby declare that the following is a full and exact description
thereof, reference being had to the drawing which accompany and
make part of this specification. The hoop poles or other stuff from
which hoops for barrels and other vessels are to be made, are after
being split out to be dressed by means of revolving cutters, the thickness
to be given to them being regulated by means of a guage adapted
thereto - A is the cutter wheel attached to the shaft or mandrel B which
may receive its revolving motion by means of whirls and a band as
represented in the drawing or in any other convenient way - The cutters
C.C are fixed in their places by means of screws, their cutting edge
being rounded on the face of the wheel corresponding thereto, we usually
employ four cutters, but this number may be varied according to the
diameter of the cutter wheel, and the velocity with which it is made to
revolve - If it is preferred the cutters may be made to operate from
the edge or periphery of the wheel instead of upon its face, the other parts
of the machine being in this case so varied as to adapt them to this con-
struction, we however prefer the cutting upon the face, as the cutter wheel
may then be small and the cut surface is left perfectly flat - D is a roller
forming a part of the guage and against this roller bears the outside of
the hoop, whilst the inside is dressed - The edge of the hoop is sustained
upon a metallic rest E in front of the cutter wheel - The adjusting screw F.

operates upon the guage serving when necessary to regulate the distance of the roller D from the cutters and consequently to determine the thickness of the hoop. As there are knots and other defective parts frequently found upon hoop poles, and it is necessary in such parts to give additional thickness to the hoop
The guage is made capable of receding at the will of the operator, in order to adapt it to these purposes. The lever G being varied by means of its handle, the inclined slide H draws the guage back, the spring I causing it to resume its place when the hand is removed. The dotted lines represent distinctly the manner in which the part operates. We have thus fully described the construction of our Machine in the form which we intend usually to give to it, but in so doing we not mean to confine ourselves precisely to the mode of arranging the individual parts as we have represented them, as there may be considerable variance without altering the general principle upon which the machine operates, thus for example the arrangem of the lever & slide may be altered in different ways while the same end will be attained, we do not therefore claim the individual parts of the machine, as they have all been used under other combinations and for other purposes, but what we do claim as our invention is the construction of an instrument for dressing hoops made and operating substantially in the manner herein set forth, having a revolving cutter wheel, a shifting guage and the auxiliary appendages which give to it that charac by which it is distinguished from other machines for the same purpo Witnesses
Joel Brown
C. F. Fowler William B. Kimball
Abiel Percy
Franklin Spalding Ex W.G.H.

Drawing (728 words)